United States Patent Office 2,922,226
Patented Jan. 26, 1960

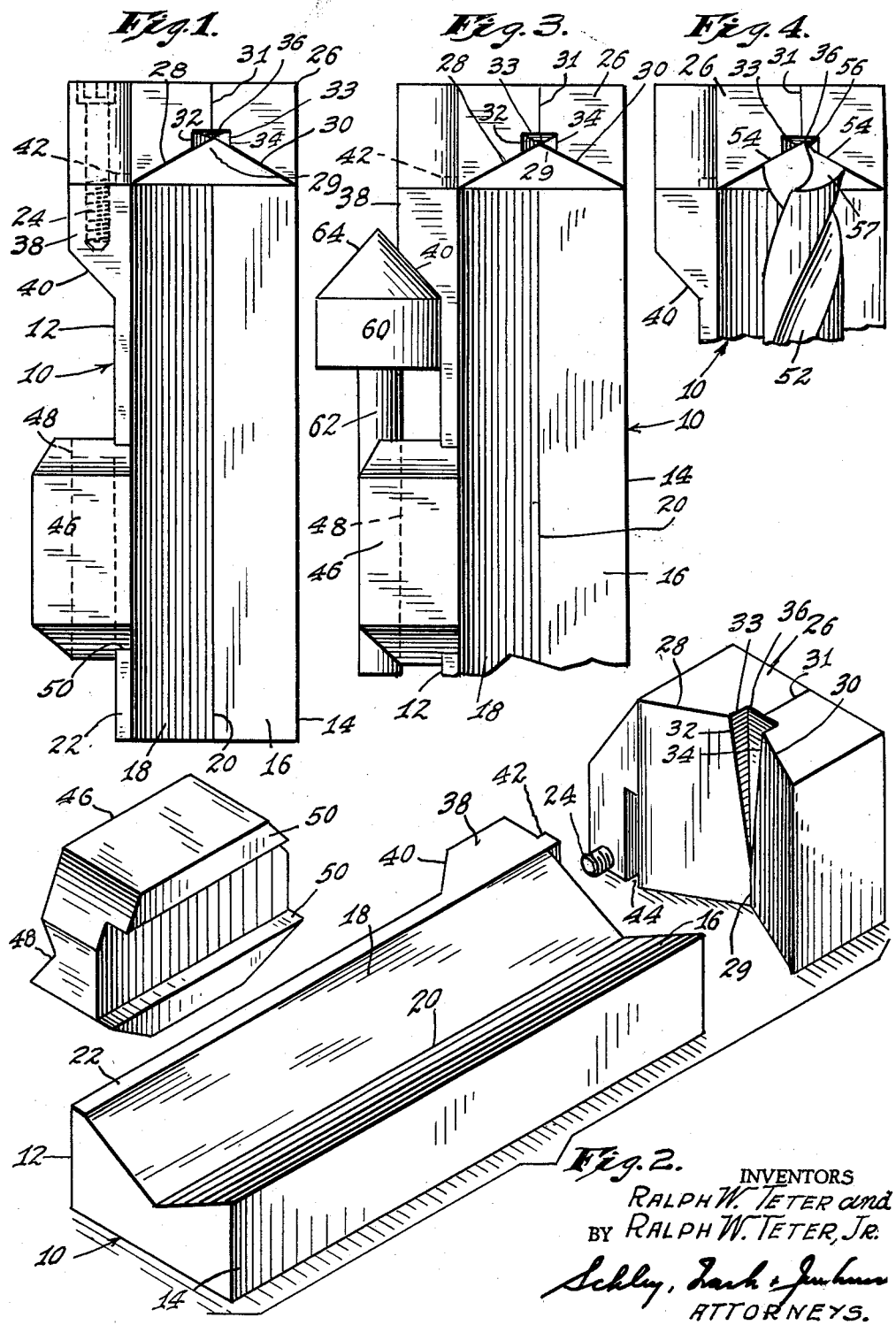

2,922,226
DRILL GAUGE

Ralph W. Teter and Ralph W. Teter, Jr., Middletown, Ind.

Application January 23, 1958, Serial No. 710,692

4 Claims. (Cl. 33—201)

This invention relates to a drill gauge, and more particularly to a gauge for gauging the points of twist drills and countersinks.

It is an object of our invention to provide a drill-grinding gauge of durable construction which will gauge the point-angle and symmetry of a plurality of sizes of drills ranging from extremely small to extremely large diameters. It is another object of our invention to provide a drill gauge which will be simple and convenient to use, and which will gauge both twist drills and countersinks.

In carrying out our invention in the preferred form, there is provided a base having a suitable groove adapted to receive the body of a drill being gauged. Mounted on one end of the base is a gauging block provided with a groove perpendicular to the groove in the base and disposed adjacent thereto to about and gauge the cutting edges of a drill point. Preferably, a recess is provided in the apex of the gauge block groove; said recess diverging laterally outwardly and longitudinally inwardly from a point substantially coplanar with the apex of the groove in the base to receive the tip of a twist drill.

Conveniently, there is a countersink gauging block disposed along one side of the base provided with a forwardly presented face extending obliquely outwardly from the side wall of said base. A countersink holder is slidably mounted on the side of the base for holding the shank of a countersink so that its cutting edges can be disposed against the forwardly presented face of the gauging block for gauging the bevel of said cutting edges.

The accompanying drawing illustrates our invention. In such drawing:

Fig. 1 is a plan view of a drill gauge embodying our invention;

Fig. 2 is an exploded isometric view of the drill gauge shown in Fig. 1;

Fig. 3 is a view similar to Fig. 1, but showing a countersink in gauging position; and Fig. 4 is a fragmental view similar to Fig. 1, but showing a twist drill in gauging position.

As shown in Fig. 1, our novel drill gauge embodies a generally rectangularly shaped base 10 having parallel side walls 12 and 14. The upper face of the base 10 constitutes a pair of converging faces 16 and 18 disposed between the side walls 12 and 14 and defining an elongated V-shaped groove 20 extending the length of the base 10 for holding the body of a drill being gauged. Conveniently, the faces 16 and 18 may converge at any desired angle; however, we have found that by disposing said faces at an angle of 120° a groove is formed which will firmly cradle the bodies of both large and small diameter drills. For reasons that will become apparent hereinafter, the face 18 terminates inwardly from the upper edge of the adjacent base side wall to provide a horizontally disposed flat 22 extending the length of the base 10.

Fixedly mounted on one end of the base 10, as by a bolt 24, is a gauge block 26. The block face adjacent the base 10 comprises a pair of milled faces 28 and 30 diverging outwardly from the center of the block 26 to form a generally V-shaped groove 29 having an apex perpendicular to the apex of the groove 20 in the base 10. Desirably, the groove 29 extends the depth of the block 26 to provide an open space between the walls 28 and 30 of the block 26 and the end wall of the base 10, thereby permitting a gauger to sight through said open space when gauging a drill point. Disposed along the upper face of the block 26 in alignment with the apexes of the grooves 20 and 29 is a centering line 31, conveniently a narrow groove, which serves as a reference index for aligning a drill in the gauge.

Formed in the apex of the groove 29 is a recess 33 adapted to receive the drill point tip, or chisel edge, angularly disposed between the cutting edges of the drill point being gauged. The recess 33 is formed by a pair of triangularly shaped side walls 32 and 34 diverging outwardly and upwardly from a point substantially coplanar with the apex of the base groove 20 to the upper face of the block 26. Although any desired angle of divergence may be used, we have found that an angle of approximately 14° accommodates the chisel edges of both large and small diameter drills. The triangularly shaped back wall 36 of the recess 33 slopes inwardly into the block 26 from the point of divergence of the side walls 32 and 34.

Integrally formed or otherwise rigid with the base 10 adjacent the end of the side wall provided with the flat 22 is a countersink gauge block 38 having its forwardly presented face 40 extending obliquely outwardly from the base side wall. As in the case of the previously described gauging faces, the face 40 may be disposed at any convenient angle to the base side wall, but we have found that an angle of about 140° is suitable for most countersink gauging operations. As shown in Fig. 2, a rearwardly projecting locating rib 42 is provided on the block 38 which is carried in a cooperating slot 44 cut in the front face of the gauge block 26 to locate the block 26 on the base 10 and prevent it from rotating about the axis of the bolt 24.

Slidably mounted on the same base wall as the block 38 is a countersink holder 46 having a V-shaped groove 48 milled in its laterally presented face for cradling the shank of a countersink. The holder 46 is slidably carried on the base 10 by a pair of longitudinally extending parallel lips 50 adapted to fit over the lower face of the base 10 and the flat 22.

As shown in Fig. 4, a conventional straight shank twist drill 52 having the forward ends of its beveled cutting edges 54 angularly interconnected by a chisel edge 56 may be gauged in our device by placing the drill in the base groove 20. The drill 52 is then moved toward the block 26 until the chisel edge 56 is received in the recess 33. With the drill in this position it is rotated until its cutting edges 54 abut the block faces 28 and 30 and the point angle (bevel of the cutting edges 54) is gauged by sighting downwardly from the top of the gauge and/or upwardly through the space between the block faces 28 and 30 and the base end wall to determine if the cutting edges 54 abut the faces 28 and 30 along the length of said edges. The drill 52 is then rotated 90° to vertically align the chisel edge with the center line 31 on the block 26, in which position the portions 57 of the drill point trailing the cutting edges 54 engage the block faces 28 and 30 are gauged. In a correctly pointed drill disposed in the two positions above described, the cutting edges 54 will abut the block faces 28 and 30 along their entire lengths and the portions 57 of the point trailing the cutting edges will engage the block faces along their lengths respectively.

The necessity for providing the recess 33 in the gauge block 26 is particularly important in gauging large diameter drills where the angularly disposed chisel edge offsets the adjacent ends of the cutting edges 54 at a relatively large angle to each other. In gauging the points of such drills without the provision of the recess 33 to accommodate the chisel edge producing this offset spacing, one of the cutting edges will be offset from one of the gauging faces thereby obviating an accurate gauging operation.

As shown in Fig. 3, the point of a countersink 60 having a shank 62 and cutting edges 64 may be gauged by disposing the shank 62 in the groove 48 of the holder 46 and sliding said holder toward the gauge block 38 until a cutting edge 64 of the countersink abuts the block face 40. Then by rotating the countersink 60 through an arc of 360° the bevel of the cutting edges 64 may be gauged. While in most cases, the entire length of the cutting edges 64 will not engage the face 40, we have found that the face 40 engages a sufficient length of the cutting edge 64 to determine if the countersink point is properly beveled and aligned with the axis of the countersink.

We claim as our invention:

1. A drill gauge, comprising a base having a groove therein adapted to support the body of a drill being gauged, a gauge block secured to one end of said base and provided with a drill point-receiving groove disposed substantially perpendicular to the base groove, and a recess formed in the apex of the groove in said block for receiving the chisel edge of a drill point to center said point in the gauge block and dispose the point cutting edges against the gauging faces of said gauge block groove for gauging said cutting edges, said recess having a pair of opposed triangularly shaped side walls normal to a triangularly shaped back wall.

2. A drill gauge, comprising a base having a groove therein adapted to support the body of a drill being gauged, a gauge block secured to one end of said base and provided with a drill point-receiving groove disposed substantially perpendicular to the base groove, and a recess formed in the apex of the groove in said block for receiving the chisel edge of a drill point to center said point in the gauge block and dispose the point cutting edges against the gauging faces of said gauge block groove for gauging said cutting edges, said recess diverging laterally outwardly and sloping inwardly into the block from a point substantially coplanar with the apex of the base groove.

3. A drill gauge as set forth in claim 2 in which said recess extends upwardly to the upper face of the gauge block.

4. A drill gauge, comprising a base having a groove therein adapted to support the body of a drill being gauged, a gauge block secured to one end of said base and provided with a drill point-receiving groove disposed substantially perpendicular to the base groove, a triangular wedge-shaped recess in the apex of said block groove for receiving the chisel edge of a drill point to dispose the cutting edges of said drill point against the gauging faces of said gauge block for gauging the bevel of said cutting edges, and a centering line in the upper face of said gauge block in alignment with the apexes of the base and block grooves for vertically centering the chisel edge of a drill point to gauge the portions of the point trailing the cutting edges against the gauging faces of the gauge block.

References Cited in the file of this patent
UNITED STATES PATENTS

| | | |
|---|---|---|
| 1,174,009 | Hjorth | Feb. 29, 1916 |
| 1,997,758 | Trefenbacher | Apr. 16, 1935 |
| 2,577,228 | Carlson | Dec. 4, 1951 |